United States Patent
Bae et al.

(10) Patent No.: US 10,793,710 B2
(45) Date of Patent: Oct. 6, 2020

(54) THERMOPLASTIC RESIN COMPOSITION AND MOLDED PRODUCT COMPRISING SAME

(71) Applicant: LOTTE ADVANCED MATERIALS CO., LTD., Yeosu-si (KR)

(72) Inventors: Yun Seok Bae, Uiwang-si (KR); Kyun Ha Ban, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 127 days.

(21) Appl. No.: 15/763,879

(22) PCT Filed: Sep. 29, 2016

(86) PCT No.: PCT/KR2016/010872
§ 371 (c)(1),
(2) Date: Mar. 28, 2018

(87) PCT Pub. No.: WO2017/057904
PCT Pub. Date: Apr. 6, 2017

(65) Prior Publication Data
US 2018/0237630 A1   Aug. 23, 2018

(30) Foreign Application Priority Data
Sep. 30, 2015 (KR) ........................ 10-2015-0138246

(51) Int. Cl.
*C08L 25/08* (2006.01)
*C08L 35/06* (2006.01)
*C08L 77/02* (2006.01)

(52) U.S. Cl.
CPC ............... *C08L 35/06* (2013.01); *C08L 25/08* (2013.01); *C08L 77/02* (2013.01); *C08L 2205/025* (2013.01); *C08L 2205/03* (2013.01); *C08L 2205/035* (2013.01); *C08L 2207/04* (2013.01)

(58) Field of Classification Search
CPC .......... C08L 35/06; C08L 77/02; C08L 25/08; C08L 2205/025; C08L 2205/03; C08L 2205/035; C08L 2207/04
See application file for complete search history.

(56) References Cited

U.S. PATENT DOCUMENTS

| 4,743,646 A | 5/1988 | Miura et al. |
| 4,757,109 A | 7/1988 | Kishida et al. |
| 5,650,466 A | 7/1997 | Gottschalk et al. |
| 5,965,666 A | 10/1999 | Koo et al. |
| 7,026,394 B2 | 4/2006 | Park et al. |
| 2004/0048981 A1 | 3/2004 | Park et al. |
| 2007/0155898 A1 | 7/2007 | Na et al. |
| 2009/0239990 A1 | 9/2009 | Weber et al. |
| 2012/0316261 A1 | 12/2012 | Bradley |

FOREIGN PATENT DOCUMENTS

| CN | 101265359 A | 9/2008 |
| CN | 101759951 A | 6/2010 |
| KR | 10-2003-0007517 A | 1/2003 |
| WO | 2005/111147 A1 | 11/2005 |
| WO | 2017/057904 A1 | 4/2017 |

OTHER PUBLICATIONS

Author Unknown, Polyimilex Bulletin from Nippon Shokubai, https://www.shokubai.co.jp/en/products/functionality/pdf/polyimilex_td.pdf, Date unknown, 4 pages.*
Extended Search Report in counterpart European Application No. 16852050.0 dated May 29, 2019, pp. 1-7.
International Search Report in counterpart International Application No. PCT/KR/2016/010872 dated Jan. 6, 2017, pp. 1-4.

* cited by examiner

*Primary Examiner* — Patrick D Niland
(74) *Attorney, Agent, or Firm* — Additon, Higgins & Pendleton, P.A.

(57) ABSTRACT

A thermoplastic resin composition of the present invention contains: a first aromatic vinyl-based resin, which is a copolymer of an aromatic vinyl-based monomer and a maleic acid anhydride; a second aromatic vinyl-based resin, which is a copolymer of an aromatic vinyl-based monomer, a maleic acid anhydride, and a maleimide-based monomer represented by chemical formula 1; a rubber-modified vinyl-based graft copolymer; and a reinforcing filler. The thermoplastic resin composition is excellent in view of heat resistance, rigidity, dimensional stability, and the like.

13 Claims, No Drawings

THERMOPLASTIC RESIN COMPOSITION AND MOLDED PRODUCT COMPRISING SAME

CROSS-REFERENCE TO RELATED APPLICATIONS

This application claims priority to and the benefit of International Application No. PCT/KR2016/010872, filed Sep. 29, 2016, which published as WO 2017/057904 on Apr. 6, 2017; and Korean Patent Application No. 10-2015-0138246, filed in the Korean Intellectual Property Office on Sep. 30, 2015, the entire disclosure of each of which is incorporated herein by reference.

TECHNICAL FIELD

The present invention relates to a thermoplastic resin composition and a molded product comprising the same. More particularly, the present invention relates to a thermoplastic resin composition that exhibits good properties in terms of thermal resistance, stiffness, dimensional stability, and the like, and a molded product produced therefrom.

BACKGROUND ART

A rubber-modified vinyl-based graft copolymer resin such as acrylonitrile-butadiene-styrene (ABS) has good properties in terms of impact resistance, moldability, external appearance, and the like, and is broadly used in various fields including automobile components, electric/electronic products, office machinery, and the like.

In order to allow such a rubber-modified vinyl-based graft copolymer resin to be applied to interior/exterior materials for automobile components and electric/electronic products, the rubber-modified vinyl-based graft copolymer resin is required to exhibit good thermal resistance, stiffness, and dimensional stability. In order to improve thermal resistance of the rubber-modified vinyl-based graft copolymer resin, a method of replacing part of components constituting the rubber-modified vinyl-based graft copolymer resin with a heat resistant copolymer has been developed. For example, a molded product produced through melt extrusion of a rubber-modified vinyl-based graft copolymer such as acrylonitrile-butadiene-styrene graft copolymer (g-ABS), or an aromatic vinyl-based copolymer such as styrene-acrylonitrile (SAN) with an aromatic vinyl-based copolymer having good thermal resistance, such as α-methylstyrene-styrene-acrylonitrile (AMS-SAN), styrene-N-phenyl maleimide-maleic anhydride (SMI), and N-phenyl maleimide-styrene-acrylonitrile (PMI-SAN), is used.

In addition, although reinforcing fillers such as glass fibers are used in order to enhance mechanical properties, such as stiffness, of a thermoplastic resin composition comprising a rubber-modified vinyl-based graft copolymer and a copolymer having good thermal resistance, such reinforcing fillers have a limit in enhancement of the mechanical properties of the thermoplastic resin composition and increase in amount of the reinforcing fillers can cause increase in specific gravity and deterioration in impact resistance.

Therefore, there is a need for development of a thermoplastic resin composition which has a low specific gravity and exhibits good properties in terms of thermal resistance, stiffness and dimensional stability, despite use of reinforcing fillers.

The background technique of the present invention is disclosed in U.S. Pat. No. 4,757,109 and the like.

DISCLOSURE

Technical Problem

It is one object of the present invention to provide a thermoplastic resin composition exhibiting good properties in terms of thermal resistance, stiffness, and dimensional stability.

It is another object of the present invention to provide a thermoplastic resin composition that can reduce the content of reinforcing fillers and the specific gravity of the thermoplastic resin composition by maximizing property improvement resulting from addition of the reinforcing fillers.

It is a further object of the present invention to provide a molded product produced from the thermoplastic resin composition.

The above and other objects of the present invention can be achieved by the present invention described below.

Technical Solution

One aspect of the present invention relates to a thermoplastic resin composition including: a first aromatic vinyl-based resin comprising a copolymer of an aromatic vinyl-based monomer and maleic anhydride; a second aromatic vinyl-based resin comprising a copolymer of an aromatic vinyl-based monomer, maleic anhydride and a maleimide-based monomer represented by Formula 1; a rubber-modified vinyl-based graft copolymer; and reinforcing fillers.

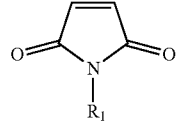

[Formula 1]

where $R_1$ is a $C_1$ to $C_{20}$ hydrocarbon group.

In some embodiments, the thermoplastic resin composition may include about 100 parts by weight of the first aromatic vinyl-based resin, about 5 to about 30 parts by weight of the second aromatic vinyl-based resin, about 10 to about 90 parts by weight of the rubber-modified vinyl-based graft copolymer, and about 5 to about 70 parts by weight of the reinforcing fillers.

In some embodiments, the first aromatic vinyl-based resin may be a copolymer of about 60 mol % to about 95 mol % of the aromatic vinyl-based monomer and about 5 mol % to about 40 mol % of the maleic anhydride.

In some embodiments, the first aromatic vinyl-based resin may have a weight average molecular weight of about 50,000 g/mol to about 200,000 g/mol.

In some embodiments, the second aromatic vinyl-based resin may be a copolymer of about 25 mol % to about 70 mol % of the aromatic vinyl-based monomer, about 0.1 mol % to about 10 mol % of the maleic anhydride, and about 25 mol % to about 70 mol % of the maleimide-based monomer.

In some embodiments, the second aromatic vinyl-based resin may have a weight average molecular weight of about 100,000 g/mol to about 250,000 g/mol.

In some embodiments, the rubber-modified vinyl-based graft copolymer may be formed by graft polymerization of an aromatic vinyl-based monomer and a monomer copolymerizable with the aromatic vinyl-based monomer to a rubber polymer.

In some embodiments, the reinforcing fillers may include at least one of carbon fiber, glass fiber, and mineral fillers.

In some embodiments, the thermoplastic resin composition may further include a polyamide resin.

In some embodiments, the thermoplastic resin composition may have a heat deflection temperature of about 110° C. to about 160° C., as measured in accordance with ASTM D648.

In some embodiments, the thermoplastic resin composition may have a tensile strength of about 70 MPa to about 160 MPa, as measured in accordance with ASTM D638.

In some embodiments, the thermoplastic resin composition may have a machine direction (MD) molding shrinkage ratio of about 0.25% or less and a transverse direction (TD) molding shrinkage ratio of about 0.4% or less, as measured on a circular specimen having a thickness of about 3.2 mm and a diameter of about 100 mm in accordance with ASTM D955.

Another aspect of the present invention relates to a molded product produced from the thermoplastic resin composition.

Advantageous Effects

The present invention provides a thermoplastic resin composition exhibiting good properties in terms of thermal resistance, stiffness and dimensional stability, and capable of reducing the content of reinforcing fillers and the specific gravity of the thermoplastic resin composition by maximizing property improvement resulting from addition of the reinforcing fillers, and a molded product produced from the thermoplastic resin composition.

BEST MODE

Hereinafter, embodiments of the present invention will be described in detail.

A thermoplastic resin composition according to the present invention includes (A) a first aromatic vinyl-based resin; (B) a second aromatic vinyl-based resin; (C) a rubber-modified vinyl-based graft copolymer; and (D) reinforcing fillers.

(A) First Aromatic Vinyl-Based Resin

According to embodiments of the present invention, the first aromatic vinyl-based resin is a copolymer of an aromatic vinyl-based monomer and maleic anhydride, and is used as a base resin for the thermoplastic resin composition while enhancing dimensional stability, thermal resistance and other properties of the thermoplastic resin composition together with the reinforcing fillers and the like.

In some embodiments, the first aromatic vinyl-based resin may be obtained by polymerization of a monomer mixture including the aromatic vinyl-based monomer and the maleic anhydride, in which polymerization of the monomer mixture is performed by a typical polymerization method known in the art, such as emulsion polymerization, solution polymerization, suspension polymerization, bulk polymerization, and the like, or may be obtained from commercially available products.

In some embodiments, the aromatic vinyl-based monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof.

In some embodiments, the aromatic vinyl-based monomer may be present in an amount of about 60 mol % to about 95 mol %, for example, about 65 mol % to about 90 mol %, based on 100 mol % of the monomer mixture (the aromatic vinyl-based monomer and the maleic anhydride), and the maleic anhydride may be present in an amount of about 5 mol % to about 40 mol %, for example, about 10 mol % to about 35 mol %, based on 100 mol % of the monomer mixture. Within these range, the thermoplastic resin composition can have good properties in terms of dimensional stability, thermal resistance, and the like.

In some embodiments, the first aromatic vinyl-based resin may have a weight average molecular weight of about 50,000 g/mol to about 200,000 g/mol, for example, about 80,000 g/mol to about 150,000 g/mol, as measured by gel permeation chromatography (GPC). Within this range, the thermoplastic resin composition can have good properties in terms of dimensional stability, thermal resistance, processability, and the like.

(B) Second Aromatic Vinyl-Based Resin

According to embodiments of the present invention, the second aromatic vinyl-based resin is a copolymer of an aromatic vinyl-based monomer, maleic anhydride and a maleimide-based monomer, and can enhance thermal resistance and other properties of the thermoplastic resin composition.

In some embodiments, the second aromatic vinyl-based resin may be obtained by preparing a precursor through polymerization of a monomer mixture including the aromatic vinyl-based monomer and the maleic anhydride, followed by imidization of the precursor, in which polymerization of the monomer mixture is performed by a typical polymerization method known in the art, such as emulsion polymerization, suspension polymerization, bulk polymerization, and the like, or may be obtained from commercially available products.

In some embodiments, the aromatic vinyl-based monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof.

In some embodiments, the aromatic vinyl-based monomer may be present in an amount of about 25 mol % to about 70 mol %, for example, about 30 mol % to about 65 mol %, based on 100 mol % of the monomer mixture. Within this range, the thermoplastic resin composition can have good properties in terms of thermal resistance and the like.

In some embodiments, the maleic anhydride may be present in an amount of about 0.1 mol % to about 10 mol %, for example, about 0.5 mol % to about 8 mol %, based on 100 mol % of the monomer mixture. Within this range, the thermoplastic resin composition can have good properties in terms of thermal resistance and the like.

In some embodiments, the maleimide-based monomer may be a compound represented by Formula 1.

[Formula 1]

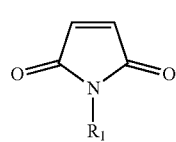

In Formula 1, $R_1$ is a $C_1$ to $C_{20}$ hydrocarbon group, for example, a $C_1$ to $C_{20}$ alkyl group or a $C_6$ to $C_{20}$ aryl group, specifically a methyl group, an ethyl group, a propyl group, a cyclohexyl group, or a phenyl group. Examples of the maleimide-based monomer may include N-phenyl maleimide (PMI), without being limited thereto.

In some embodiments, the maleimide-based monomer may be present in an amount of about 25 mol % to about 70 mol %, for example, about 30 mol % to about 65 mol %, based on 100 mol % of the monomer mixture. Within this range, the thermoplastic resin composition can have good properties in terms of thermal resistance and the like.

In some embodiments, the second aromatic vinyl-based resin may have a weight average molecular weight of about 100,000 g/mol to about 250,000 g/mol, for example, about 120,000 g/mol to about 170,000 g/mol, as measured by gel permeation chromatography (GPC). Within this range, the thermoplastic resin composition can have good properties in terms of thermal resistance, stiffness, and the like.

In some embodiments, the second aromatic vinyl-based resin may be present in an amount of about 5 to about 30 parts by weight, for example, about 5 to about 25 parts by weight, relative to about 100 parts by weight of the first aromatic vinyl-based resin. Within this range, the thermoplastic resin composition can have good properties in terms of thermal resistance, stiffness, dimensional stability, and balance therebetween.

(C) Rubber-Modified Vinyl-Based Graft Copolymer

According to embodiments of the present invention, the rubber-modified vinyl-based graft copolymer may be obtained through graft polymerization of an aromatic vinyl-based monomer and a monomer copolymerizable with the aromatic vinyl-based monomer to a rubber polymer. For example, the rubber-modified vinyl-based graft copolymer may be obtained by adding the aromatic vinyl-based monomer and the monomer copolymerizable with the aromatic vinyl-based monomer to the rubber polymer, followed by polymerization, and may further include a monomer for imparting processability and thermal resistance, as needed. The polymerization may be performed by any typical polymerization method known in the art, such as emulsion polymerization, suspension polymerization, and bulk polymerization.

In some embodiments, the rubber polymer may include diene rubbers such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); and ethylene-propylene-diene monomer terpolymer (EPDM). These may be used alone or as a mixture thereof. For example, the rubber polymer may be a diene rubber, for example, a polybutadiene (PBD) rubber. The rubber polymer may be present in an amount of about 5 wt % to about 65 wt %, for example, about 10 wt % to about 60 wt %, based on 100 wt % of the rubber-modified vinyl-based graft copolymer. Within this range, the thermoplastic resin composition including the rubber-modified vinyl-based graft copolymer can have good mechanical properties including impact resistance, thermal resistance, flowability, and the like.

In some embodiments, the rubber polymer (rubber particles) may have an average (Z-average) particle diameter of about 0.05 µm to about 6 µm, for example, about 0.15 µm to about 4 µm. Within this range of average particle diameter, the thermoplastic resin composition including the rubber-modified vinyl-based graft copolymer can have good mechanical properties including impact resistance, thermal resistance, flowability, and the like.

In some embodiments, the rubber polymer may be formed by polymerizing the aromatic vinyl-based monomer and the vinyl cyanide-based monomer swollen into the rubber polymer. For example, the rubber polymer may be prepared by adding a mixture of the aromatic monomer, the vinyl cyanide-based monomer, and a polymerization initiator to the rubber polymer, followed by stirring the mixture and the rubber polymer in the presence of an emulsifier, a molecular weight regulator and water such that the aromatic monomer and the vinyl cyanide-based monomer are swollen into the rubber polymer; and polymerizing the aromatic monomer and the vinyl cyanide-based monomer swollen into the rubber polymer, without being limited thereto. Such a method of forming the rubber polymer (core) is well known in the art and can be easily performed by those skilled in the art.

In some embodiments, the aromatic vinyl-based monomer is a monomer graft-copolymerizable with the rubber copolymer, and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl-based monomer may be present in an amount of about 15 wt % to about 94 wt %, for example, about 20 wt % to about 80 wt %, based on 100 wt % of the rubber-modified vinyl-based graft copolymer. Within this range, the thermoplastic resin composition including the rubber-modified vinyl-based graft copolymer can have good mechanical properties including impact resistance, thermal resistance, flowability, and the like.

In some embodiments, the monomer copolymerizable with the aromatic vinyl-based monomer may include acrylonitrile, methacrylonitrile, ethacrylonitrile, phenylacrylonitrile, α-chloroacrylonitrile, and fumaronitrile, without being limited thereto. These may be used alone or as a mixture thereof. Specifically, acrylonitrile, methacrylonitrile, and the like may be used as the monomer copolymerizable with the aromatic vinyl-based monomer. The monomer copolymerizable with the aromatic vinyl-based monomer may be present in an amount of about 1 wt % to about 50 wt %, for example, about 5 wt % to about 45 wt %, based on 100 wt % of the rubber-modified vinyl-based graft copolymer. Within this range, the thermoplastic resin composition including the rubber-modified vinyl-based graft copolymer can have good mechanical properties including impact resistance, thermal resistance, flowability, and the like.

In some embodiments, the monomer for imparting processability and thermal resistance may include, for example, acrylic acid, methacrylic acid, maleic anhydride, a maleimide-based monomer (N-substituted maleimide), and mixtures thereof, without being limited thereto. The monomer for imparting processability and thermal resistance may be present in an amount of about 15 wt % or less, for example, about 10 wt % or less, based on 100 wt % of the rubber-modified vinyl-based graft copolymer. Within this range, the rubber-modified vinyl-based graft copolymer can improve processability and thermal resistance of the thermoplastic resin composition without deterioration in other properties thereof.

In some embodiments, the rubber-modified vinyl-based graft copolymer may include, for example, acrylonitrile-butadiene-styrene graft copolymer (g-ABS) in which styrene as the aromatic vinyl-based monomer and acrylonitrile as the vinyl cyanide-based monomer are grafted to a core of a butadiene-based rubber polymer.

In some embodiments, the rubber-modified vinyl-based graft copolymer may be present in an amount of about 10 to about 90 parts by weight, for example, about 30 to about 80 parts by weight, relative to about 100 parts by weight of the first aromatic vinyl-based resin. Within this range, the rubber-modified vinyl-based graft copolymer can enhance properties of the thermoplastic resin composition in terms of thermal resistance, stiffness, dimensional stability, and balance therebetween.

(D) Reinforcing Filler

According to embodiments of the present invention, the reinforcing fillers can enhance mechanical properties, such as stiffness and the like, of the thermoplastic resin composition, and may include carbon fiber, glass fiber, mineral fillers, and combinations thereof. Preferably, carbon fiber may be used in order to reduce the specific gravity of the thermoplastic resin composition.

In some embodiments, the carbon fiber may have an average particle diameter of about 4 µm to about 12 µm, for example, about 6 µm to about 10 µm, and an average length of about 3 mm to about 12 mm, for example, about 4 mm to about 10 mm. Within these ranges, the carbon fiber can enhance stiffness of the thermoplastic resin composition without deterioration in other properties thereof.

In some embodiments, the glass fiber may have an average particle diameter of about 8 µm to about 14 µm, for example, about 10 µm to about 13 µm, and an average length of about 3 mm to about 6 mm, for example, about 3 mm to about 4 mm. The glass fiber may be partially or entirely coated with a coupling agent, without being limited thereto.

In some embodiments, the mineral fillers may include talc, wollastonite, whisker, mica, basalt fibers, and combinations thereof, without being limited thereto. The mineral fillers may have various shapes such as a fiber shape, a particle shape, a rod shape, a needle shape, a flake shape, and an amorphous shape, and may have various cross-sectional shapes, such as a circular cross-sectional shape, an elliptical cross-sectional shape, and a rectangular cross-sectional shape. In addition, the mineral fillers may have an average particle size of, for example, about 50 nm to about 100 µm, without being limited thereto.

In some embodiments, the reinforcing fillers may be present in an amount of about 5 to about 70 parts by weight, for example, about 10 to about 60 parts by weight, relative to about 100 parts by weight of the first aromatic vinyl-based resin. Within this range, the reinforcing fillers can enhance properties of the thermoplastic resin composition in terms of thermal resistance, stiffness, dimensional stability, and balance therebetween while reducing the specific gravity of the thermoplastic resin composition as compared with that of a typical reinforced thermoplastic resin composition.

According to embodiments of the present invention, the thermoplastic resin composition may further include a polyamide resin in order to enhance efficiency of the reinforcing fillers while reducing the amount thereof.

In some embodiments, the polyamide resin may include aliphatic polyamide resins such as Polyamide 6 and Polyamide 66, (semi)aromatic polyamide resins such as polyamide 6T, polyamide MXD6, and the like. For example, polyamide 6 or polyamide 66 may be used as the polyamide resin.

In some embodiments, the polyamide resin may have an intrinsic viscosity (IV) of about 2.3 dL/g to about 3.0 dL/g, for example, about 2.3 dL/g to about 2.5 dL/g, as measured in a concentration of about 0.5 g/dL at about 25° C. in strong sulfuric acid (96%). Within this range, the polyamide resin can secure good flowability of the thermoplastic resin composition.

In some embodiments, the polyamide resin may be present in an amount of about 10 to about 150 parts by weight, for example, about 20 to about 100 parts by weight, relative to about 100 parts by weight of the first aromatic vinyl-based resin. Within this range, the polyamide resin can enhance properties of the thermoplastic resin composition in terms of thermal resistance, stiffness, dimensional stability, and balance therebetween while reducing the specific gravity of the thermoplastic resin composition as compared with that of a typical reinforced thermoplastic resin composition.

In some embodiments, the thermoplastic resin composition may further include typical additives, as needed. Examples of the additives may include flame retardants, antioxidants, anti-dripping agents, lubricants, release agents, nucleating agents, antistatic agents, stabilizers, pigments, dyes, and mixtures thereof, without being limited thereto. The additive may be present in an amount of about 0.001 to about 20 parts by weight relative to about 100 parts by weight of the first aromatic vinyl-based resin, without being limited thereto.

In some embodiments, the thermoplastic resin composition may have a heat deflection temperature of about 110° C. to about 160° C., for example, about 120° C. to about 150° C., as measured in accordance with ASTM D648, a tensile strength of about 70 MPa to about 160 MPa, for example, about 80 MPa to about 150 MPa, as measured in accordance with ASTM D638, and a machine direction (MD) molding shrinkage ratio of about 0.25% or less, for example, about 0.05% to about 0.2%, and a transverse direction (TD) molding shrinkage ratio of about 0.4% or less, for example, about 0.1% to about 0.38%, as measured on a circular specimen having a thickness of about 3.2 mm and a diameter of about 100 mm in accordance with ASTM D955.

A molded product according to the present invention is produced from the thermoplastic resin composition. The thermoplastic resin composition according to the embodiments of the present invention may be prepared by any known method of preparing a thermoplastic resin composition. For example, the aforementioned components and, optionally, other additives are mixed, followed by melt extrusion in an extruder, thereby preparing a thermoplastic resin composition in pellet form. The prepared pellets may be produced into various molded products (products) by various molding methods, such as injection molding, extrusion molding, vacuum molding, and casting. Such molding methods are well known to those skilled in the art. The thermoplastic resin composition (molded product) according to the present invention exhibits good properties in terms of thermal resistance, stiffness, dimensional stability, and the like, and thus can be advantageously used in various fields such as interior/exterior materials for automobile parts, electric/electronic products, and the like.

MODE FOR INVENTION

Next, the present invention will be described in more detail with reference to some examples. It should be understood that these examples are provided for illustration only and are not to be in any way construed as limiting the present invention.

Example

Details of components used in Examples and Comparative Examples are as follows.

(A) Aromatic Vinyl-Based Resin (A1) As the first aromatic vinyl-based resin, a styrene-maleic anhydride copolymer (SMA resin, weight average molecular weight: 80,000 g/mol, styrene/maleic anhydride (mole ratio): 74/26) was used.

(A2) As the second aromatic vinyl-based resin, a styrene-N-phenyl maleimide-maleic anhydride copolymer (SMI resin, weight average molecular weight: 148,000 g/mol, styrene/N-phenyl maleimide/maleic anhydride (mole ratio): 49/49/2) was used.

(A3) A styrene-acrylonitrile copolymer (SAN resin, weight average molecular weight: 95,000 g/mol, styrene/acrylonitrile (mole ratio): 71/29) was used.

(B) Rubber-Modified Vinyl-Based Graft Copolymer g-ABS obtained through graft copolymerization of 52 wt % of styrene and acrylonitrile (weight ratio (SM/AN): 73/27) to 48 wt % of a polybutadiene rubber (PBR, average particle diameter (Z-average): 310 nm) was used.

(C) Reinforcing Filler (C1) Carbon fiber (Manufacturer: Zoltek, Product Name: Panex® 35 (type-95)) was used.

(C2) Glass fiber (Manufacturer: Nippon Electric Glass Co., Ltd., Product Name: ECS-03T-187H) was used.

(D) Polyamide resin

Polyamide 6 (Manufacturer: Zig Sheng Industrial Co., Ltd., Product Name: N6) was used.

Examples 1 to 5 and Comparative Examples 1 to 3

The above components were placed in amounts as listed in Table 1 in a tumbler mixer and mixed for 10 minutes. Then, the mixture was added to a twin-screw extruder (L/D=32, diameter: 45 mm), and subjected to melt-extrusion at a barrel temperature of 250° C. and a screw speed of 250 rpm, thereby preparing pellets. The pellets were dried at 100° C. for 4 hours or more and injection-molded in an injection molding machine (LGH-140N, Manufacturer: LG Cable & System) at a cylinder temperature of 230° C., thereby preparing specimens. The prepared specimens were evaluated as to the following properties by the following method, and results are shown in Table 1.

Property Evaluation (1) Heat deflection temperature (HDT, unit: ° C.): Heat deflection temperature was measured at a heating rate of 120° C./hr under a load of 1.8 MPa in accordance with ASTM D648.

(2) Tensile strength (TS, unit: MPa): Tensile strength was measured on a 3.2 mm thick specimen in accordance with ASTM D638.

(3) Molding shrinkage ratio (unit: %): A machine direction (MD) molding shrinkage ratio and a transverse direction (TD) molding shrinkage ratio were measured on a 3.2 mm thick specimen having a diameter of 100 mm in accordance with ASTM D955.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| (A1) (parts by weight) | 100 | 100 | 100 | 100 | 100 | — | — | 100 |
| (A2) (parts by weight) | 16.7 | 16.7 | 11.1 | 16.7 | 11.1 | 16.7 | 11.1 | — |
| (A3) (parts by weight) | — | — | — | — | — | 100 | 100 | 16.7 |
| (B) (parts by weight) | 66.7 | 66.7 | 44.4 | 66.7 | 44.4 | 66.7 | 44.4 | 66.7 |
| (C1) (parts by weight) | 50 | — | 22.2 | 50 | 22.2 | 50 | 22.2 | 50 |
| (C2) (parts by weight) | — | 50 | — | — | — | — | — | — |
| (D) (parts by weight) | — | — | — | 100 | 44.4 | — | — | — |
| HDT (° C.) | 147 | 120 | 140 | 150 | 145 | 109 | 104 | 135 |
| TS (MPa) | 110 | 80 | 90 | 145 | 120 | 110 | 103 | 100 |
| MD molding shrinkage ratio | 0.10 | 0.18 | 0.15 | 0.12 | 0.14 | 0.28 | 0.30 | 0.11 |
| TD molding shrinkage ratio | 0.28 | 0.32 | 0.34 | 0.32 | 0.36 | 0.40 | 0.45 | 0.28 |

From the results, it could be seen that the thermoplastic resin compositions according to the present invention exhibited good properties in terms of thermal resistance, stiffness, and dimensional stability.

On the contrary, the thermoplastic resin compositions of Comparative Examples 1 and 2, which were prepared without using the first aromatic vinyl-based resin, exhibited deterioration in thermal resistance (heat deflection temperature) and dimensional stability (molding shrinkage ratio), and the thermoplastic resin composition of Comparative Example 3, which was prepared without using the second aromatic vinyl-based resin, exhibited deterioration in thermal resistance and stiffness (tensile strength).

It should be understood that various modifications, changes, alterations, and equivalent embodiments can be made by those skilled in the art without departing from the spirit and scope of the invention.

The invention claimed is:

1. A thermoplastic resin composition comprising:
a first aromatic vinyl-based resin comprising a copolymer formed of monomers consisting of an aromatic vinyl-based monomer and maleic anhydride;
a second aromatic vinyl-based resin comprising a copolymer of an aromatic vinyl-based monomer, maleic anhydride and a maleimide-based monomer represented by Formula 1;
a rubber-modified vinyl-based graft copolymer; and
reinforcing fillers,

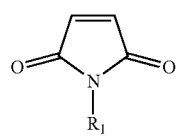

[Formula 1]

where $R_1$ is a $C_1$ to $C_{20}$ hydrocarbon group.

2. The thermoplastic resin composition according to claim 1, wherein the thermoplastic resin composition comprises about 100 parts by weight of the first aromatic vinyl-based resin, about 5 to about 30 parts by weight of the second aromatic vinyl-based resin, about 10 to about 90 parts by weight of the rubber-modified vinyl-based graft copolymer, and about 5 to about 70 parts by weight of the reinforcing fillers.

3. The thermoplastic resin composition according to claim 1, wherein the monomers of the first aromatic vinyl-based resin consist of about 60 mol % to about 95 mol % of the aromatic vinyl-based monomer and about 5 mol % to about 40 mol % of the maleic anhydride.

4. The thermoplastic resin composition according to claim 1, wherein the first aromatic vinyl-based resin has a weight average molecular weight of about 50,000 g/mol to about 200,000 g/mol.

5. The thermoplastic resin composition according to claim 1, wherein the second aromatic vinyl-based resin is a copolymer of about 25 mol % to about 70 mol % of the aromatic vinyl-based monomer, about 0.1 mol % to about 10 mol % of the maleic anhydride, and about 25 mol % to about 70 mol % of the maleimide-based monomer.

6. The thermoplastic resin composition according to claim 1, wherein the second aromatic vinyl-based resin has a weight average molecular weight of about 100,000 g/mol to about 250,000 g/mol.

7. The thermoplastic resin composition according to claim 1, wherein the rubber-modified vinyl-based graft copolymer is formed by graft polymerization of an aromatic vinyl-based monomer and a monomer copolymerizable with the aromatic vinyl-based monomer to a rubber polymer.

8. The thermoplastic resin composition according to claim 1, wherein the reinforcing fillers comprise carbon fiber, glass fiber and/or mineral fillers.

9. The thermoplastic resin composition according to claim 1, further comprising: a polyamide resin.

10. The thermoplastic resin composition according to claim 1, wherein the thermoplastic resin composition has a heat deflection temperature of about 110° C. to about 160° C., as measured under a load of 1.8 MPa in accordance with ASTM D648.

11. The thermoplastic resin composition according to claim 1, wherein the thermoplastic resin composition has a tensile strength of about 70 MPa to about 160 MPa, as measured in accordance with ASTM D638.

12. The thermoplastic resin composition according to claim 1, wherein the thermoplastic resin composition has a machine direction (MD) molding shrinkage ratio of about 0.25% or less and a transverse direction (TD) molding shrinkage ratio of about 0.4% or less, as measured on a circular specimen having a thickness of about 3.2 mm and a diameter of about 100 mm in accordance with ASTM D955.

13. A molded product produced from the thermoplastic resin composition according to claim 1.

* * * * *